US010214140B2

(12) United States Patent
Belcher et al.

(10) Patent No.: US 10,214,140 B2
(45) Date of Patent: Feb. 26, 2019

(54) ELONGATE ILLUMINATED AUTOMOTIVE DESIGN ELEMENT

(71) Applicant: SMR Patents S.à.r.l., Luxembourg (LU)

(72) Inventors: Simon Belcher, South Plympton (AU); James Dickson, Glen Osmond (AU); Jacob Messenger, Richmond (AU); Gary Dekievit, Tatachilla (AU); Sam Thoday, Sheidow Park (AU)

(73) Assignee: SMR Patents S.a.r.l., Luxembourg (LU)

( * ) Notice: Subject to any disclaimer, the term of this patent is extended or adjusted under 35 U.S.C. 154(b) by 0 days.

(21) Appl. No.: 15/402,079

(22) Filed: Jan. 9, 2017

(65) Prior Publication Data
US 2017/0197542 A1  Jul. 13, 2017

(30) Foreign Application Priority Data

Jan. 11, 2016 (AU) ................................ 2016900068

(51) Int. Cl.
*B60Q 1/28* (2006.01)
*F21S 43/20* (2018.01)
(Continued)

(52) U.S. Cl.
CPC ............. *B60Q 1/28* (2013.01); *B60Q 1/2661* (2013.01); *B60R 19/52* (2013.01); *F21S 43/14* (2018.01);
(Continued)

(58) Field of Classification Search
CPC ........ B60Q 1/0011; F21S 43/235; F21S 43/26
See application file for complete search history.

(56) References Cited

U.S. PATENT DOCUMENTS 9,416,935 B2 * 8/2016 Watanabe ............ B60Q 1/0041
2011/0170307 A1 7/2011 Ishikawa et al.
2013/0293104 A1 11/2013 Wu

FOREIGN PATENT DOCUMENTS

CN 204055319 U 12/2014
EP 2650590 A2 10/2013
(Continued)

OTHER PUBLICATIONS

European Extended Search Report, Application No. EP16203317.9, dated May 16, 2017.

*Primary Examiner* — Robert J May
(74) *Attorney, Agent, or Firm* — MacMillan, Sobanski & Todd, LLC

(57) ABSTRACT

An elongate automotive illumination assembly includes an elongate housing; at least one light source; an elongate lens having an apex region and a pair of spaced-apart blade portions. The spaced-apart blade portions extend away from the apex region to define a generally V-shaped cross-section with the apex region including an elongate light emitting surface. The blade portions connect to the elongate housing to define an enclosure. An elongate light guide guides light from the at least one light source to the elongate light emitting surface. The elongate light guide includes a body extending away from the light source(s) towards the elongate light emitting surface. The light guide is housed within the enclosure and between the blades of the lens such that the light emitting surface of the light guide is adjacent to the light emitting surface of the lens.

8 Claims, 7 Drawing Sheets

(51) Int. Cl.
*F21S 43/50* (2018.01)
*F21S 43/239* (2018.01)
*F21S 43/14* (2018.01)
*B60R 19/52* (2006.01)
*F21V 5/04* (2006.01)
*F21V 8/00* (2006.01)
*B60Q 1/26* (2006.01)
*F21S 45/50* (2018.01)

(52) U.S. Cl.
CPC ............. *F21S 43/239* (2018.01); *F21S 43/26* (2018.01); *F21S 43/50* (2018.01); *F21V 5/04* (2013.01); *G02B 6/0011* (2013.01); *G02B 6/0041* (2013.01); *G02B 6/0058* (2013.01); *B60R 2019/525* (2013.01); *F21S 45/50* (2018.01)

(56) References Cited

FOREIGN PATENT DOCUMENTS

| | | |
|---|---|---|
| EP | 2735476 A2 | 5/2014 |
| EP | 2650590 A3 | 4/2016 |
| JP | 2015099654 A | 5/2015 |

\* cited by examiner

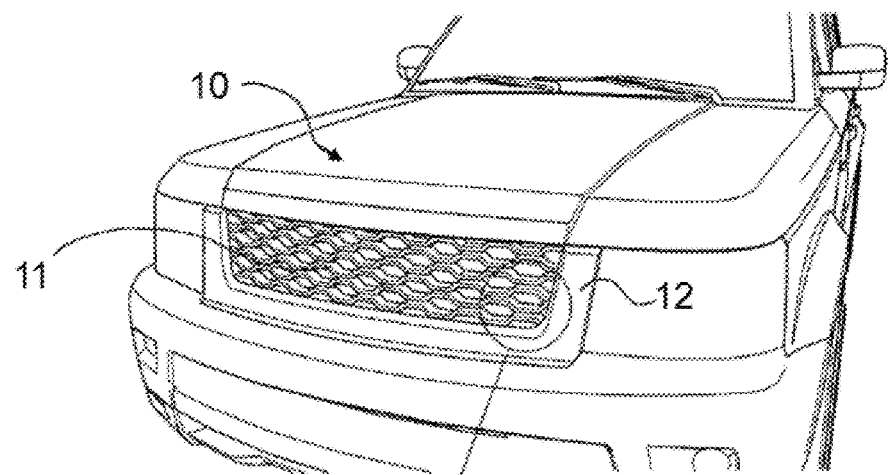
Fig. 1
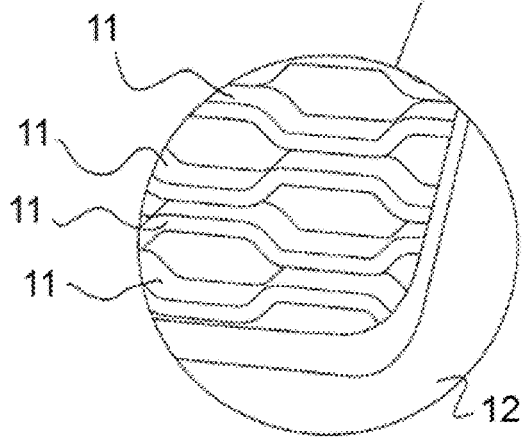 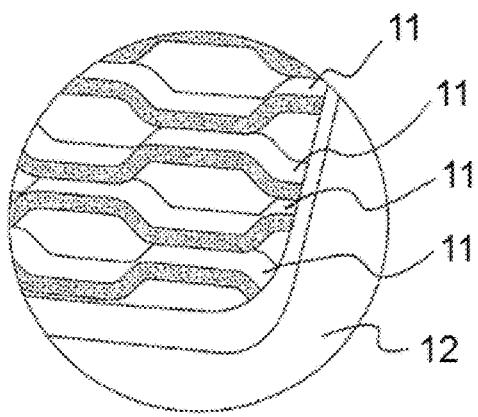
Fig. 2A  Fig. 2B

ELONGATE ILLUMINATED AUTOMOTIVE DESIGN ELEMENT

CROSS-REFERENCE TO RELATED APPLICATIONS

This application claims priority from Australian Provisional Patent Application No. 2016900068, filed Jan. 11, 2016, the disclosure of which is incorporated herein by reference in its entirety.

BACKGROUND OF THE INVENTION

This invention relates in general to an illuminated assembly. In particular, the invention relates to an elongate illumination assembly that can provide a uniform elongate light output without the use of optic features and without the light source being viewable and in particular to an elongate illuminated automotive design element.

An aesthetic feature which has become desirable in automotive applications is to provide various automotive elements which feature illumination of the key features of the elements. One example of an automotive element are grill elements. Many grill elements are elongate and may also have a repeating or non-repeating pattern. It is desirable that the grill elements are able to be illuminated along their length with an even (uniform or homogenous) luminance using light emitting diodes (LEDs) input. An LED is a directional light source having a relative luminous intensity that decreases as the viewing angle is increased. This may result in the appearance of bright or hot spots to an external viewer of the grill element.

Lighting systems that provide a uniform luminous intensity are known, for example systems using expensive organic light emitting diode (OLED) technology or complex lens and reflector arrangements. Highly diffusing materials are also used but these have the drawback of giving a milky or hazy appearance and have poor optical efficiency. Optic features may also be used on clear materials to diffuse light, but these have the drawback that the optic features are visible in the unlit state which is undesirable. A further desirable feature is that the LED input is not directly visible to the external viewer of the grill element.

It is against this background and the problems and difficulties associated therewith that the invention has been developed.

Other advantages of the invention will become apparent from the following description, taken in connection with the accompanying drawings, wherein, by way of illustration and example, preferred embodiments of the invention are disclosed.

SUMMARY OF THE INVENTION

This invention relates to an elongate illumination assembly that can provide a uniform elongate light output without the use of optic features and without the light source being viewable and in particular to an elongate illuminated automotive design element.

According to a first aspect of the invention, there is provided an elongate automotive illumination assembly, including an elongate housing, at least one light source, an elongate lens having an apex region and a pair of spaced-apart blade portions extending away from the apex region to define a generally V-shaped cross-section with the apex region including an elongate light emitting surface, the blade portions connecting to the elongate housing to define an enclosure, and an elongate light guide for guiding light from the at least one light source to the elongate light emitting surface, the elongate light guide including a body extending away from the light source(s) towards the elongate light emitting surface, wherein the light guide is housed within the enclosure and between the blades of the lens such that the light emitting surface of the light guide is adjacent to the light emitting surface of the lens.

In another form, the light guide includes a plurality of light-scattering particles.

In another form, the apex region of the elongate lens defines a first repeating wave pattern profile, the first repeating wave pattern profile having a first amplitude.

In another form, the light emitting surface of the light guide defines a second repeating wave pattern profile, the second repeating wave pattern profile having a second amplitude.

In another form, the first repeating pattern wave profile matches the second repeating wave pattern profile.

In another form, the elongate light guide has a rear region, the rear region having a third repeating wave pattern profile, the third repeating wave pattern profile having a third amplitude, wherein the third amplitude is smaller than the second amplitude.

In another form, the apex region is light transmissive.

In another form, each blade portion includes an opaque portion.

In another form, the enclosure is weatherproof.

Various aspects of this invention will become apparent to those skilled in the art from the following detailed description of the preferred embodiment, when read in light of the accompanying drawings.

BRIEF DESCRIPTION OF THE DRAWINGS

FIG. 1 is a view of an automotive grill assembly in an unlit state.

FIG. 2A is a detailed view of a section of the automotive grill assembly of FIG. 1 in an unlit state.

FIG. 2B is a detailed view of a section of the automotive grill assembly of FIG. 1 in a lit state.

DETAILED DESCRIPTION OF THE PREFERRED EMBODIMENT

Figure 3:
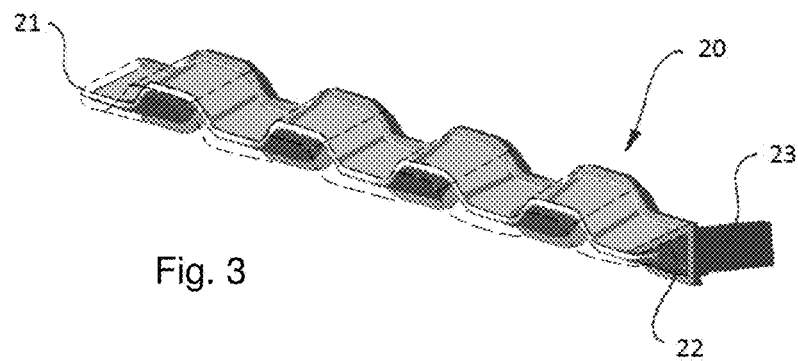
FIG. 3 is a perspective view of an elongate illumination assembly according to an embodiment of the invention.

Referring now to FIGS. 1, 2A and 2B, there is shown an automotive grill assembly 10 comprising a number of elongate grill elements 11 and a grill surround 12. In FIGS. 1 and 2A the grill assembly 10 is in an unlit state, whereas in FIG. 2B, the grill assembly 10 is in a lit state. As can be seen, the leading edge of each grill element 11 is illuminated, highlighting the repeating wave pattern of this particular embodiment.

Referring now to FIGS. 3 to 8, there is shown an elongate illumination assembly 20 according to an embodiment of the invention. The elongate illumination assembly 20 has an elongate housing 23, printed circuit boards (PCBs) 22 featuring light emitting diodes (not shown), an elongate light guide 24 and an elongate lens 21 with a generally V-shaped cross-section and repeating wave pattern profile. The lens 21 profile may be shaped in a variety of different repeating and non-repeating patterns.

The housing 23 forms the backing for the illumination assembly 20, it provides structural reinforcement to the illumination assembly 20 and may be manufactured from a weather resistant plastic such as acrylonitrile styrene acrylate (ASA) or acrylonitrile butadiene styrene (ABS). The light guide 24 and PCBs 22 are housed within the V-shape of the lens 21 which is then connected or joined to the housing 23 (e.g. by welding) such that the light guide 24 and PCBs 22 are housed within the lens 21 and housing 23.

Figure 4:
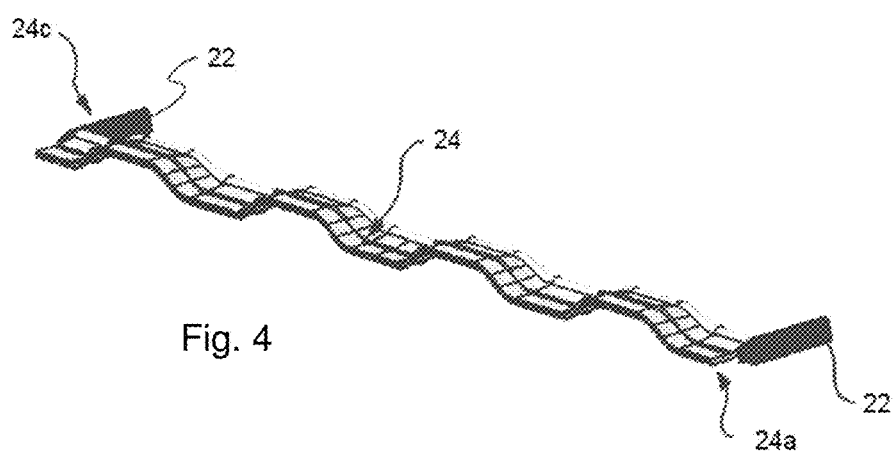
FIG. 4 is a perspective view of the elongate light guide and PCB sub-assembly of FIG. 3.
Figure 5:
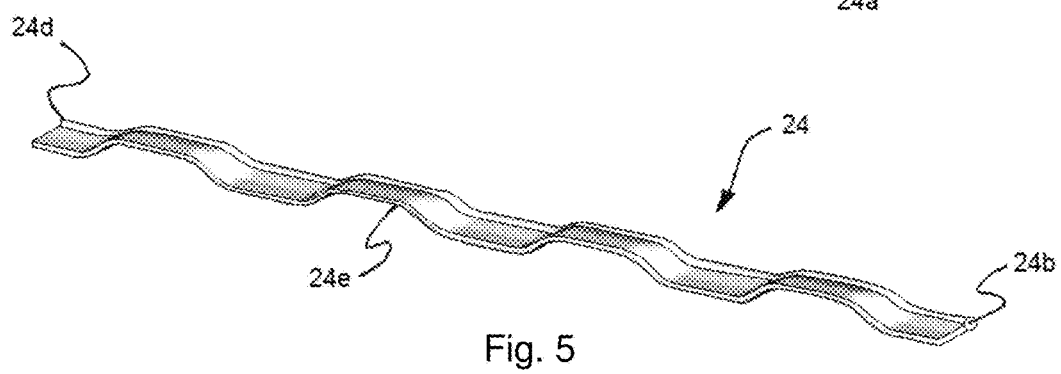
FIG. 5 is a perspective view of the elongate light guide of FIG. 4.

As is best seen in FIGS. 4 and 5, the light guide 24 has a first end 24a having a first light receiving surface 24b, a second end 24c having a second light receiving surface 24d, and a light emitting surface 24e viewable to an external viewer of the illumination assembly 20 through the lens 21. A PCB 22 is located at both the first end 24a and the second end 24c of the light guide 24. An LED light source located on each PCB 22 is positioned adjacent to the first light receiving surface 24b and the second light receiving surface 24d of the light guide 24, which is configured to allow light to enter the light guide 24 through the light receiving surfaces 24b, 24c. The light guide 24 is adapted to be substantially transparent and without any visible discrete optic features in an un-lit state while being diffusive in a lit-state. When lit, light exits the light guide 24 at light emitting surface 24e with substantially uniform luminous intensity across the surface.

Figure 6:
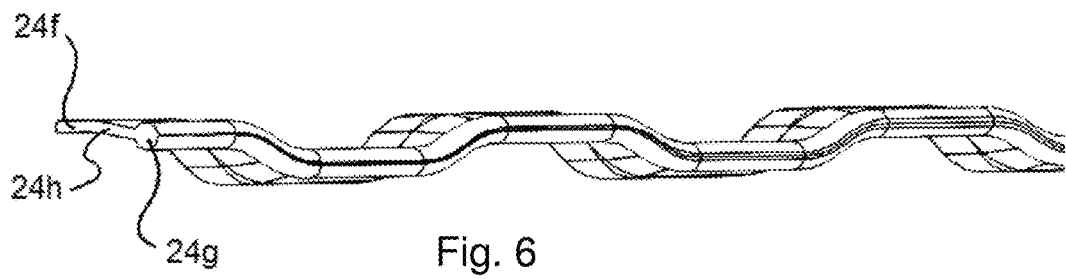
FIG. 6 is a partial rear perspective view of the elongate light guide of FIG. 4 with contour lines.
Figure 7:
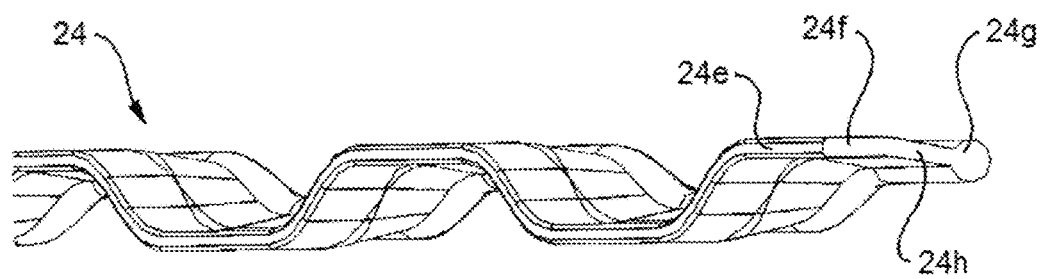
FIG. 7 is a partial front perspective view of the elongate light guide of FIG. 4 with contour lines.

As is best seen in FIGS. 6 and 7, the light guide 24 has a varying cross sectional area and profile along its depth. The light guide 24 has a front region 24f (adjacent the light emitting surface 24e) and a rear region 24g (furthest from the light emitting surface 24e). The rear region 24g has a larger sectional thickness than the front region 24f. In this embodiment, the rear region 24g has a generally bulbous shape. The front region 24f has a generally consistent sectional thickness which has a ribbon-like shape.

The light emitting surface 24e has the same repeating wave profile as the leading edge of the lens 21. The front region 24f also has this repeating wave profile. As is best seen in FIGS. 6 and 7, the rear section 24g also has a repeating wave profile but with a smaller amplitude resulting in a straighter profile.

The light guide 24 also has a transitionary region 24h, connecting the front and rear regions 24f, 24g and having a profile that transitions from that of the rear region 24g to that of the front region 24f.

Figure 8:
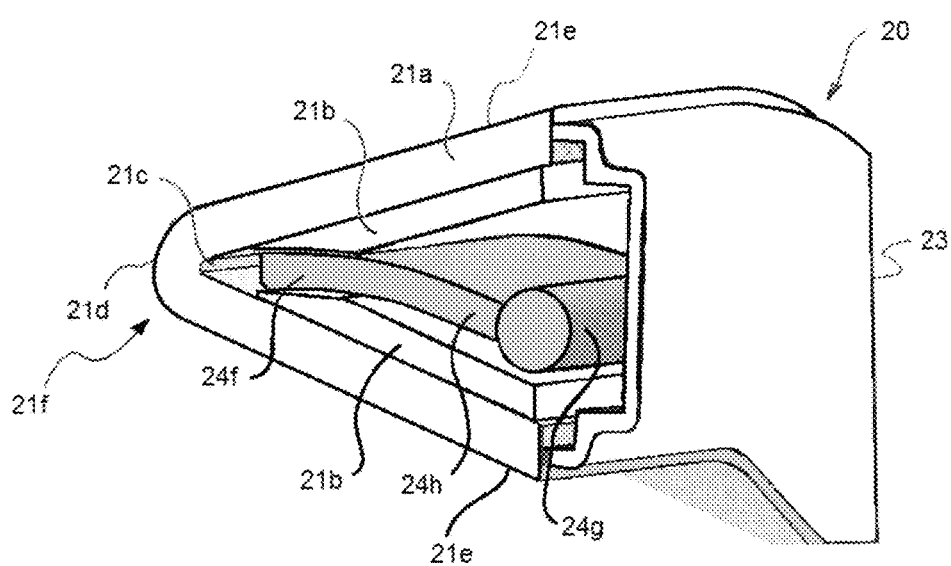
FIG. 8 is a sectional view of the elongate illumination assembly of FIG. 3.

As shown in FIG. 8, the light guide 24 is disposed behind the lens 21 which has an apex region 21f (or leading edge) with a light emitting surface 21d and from which a pair of spaced-apart blade portions 21e extend away to define the generally V-shaped cross-section. The lens 21 has a clear or tinted outer portion 21a and an opaque inner portion 21b, wherein the lens 21 remains entirely clear along the apex 21f immediately behind the light emitting surface 21d and adjacent the light emitting surface 24e of the light guide 24 to allow light emitted from the light guide 24 to enter the lens 21 and exit at the light emitting surface 21d. The effect of this composition is that in an unlit state, the grill assembly 10 has a uniform appearance with the light guide 24 being concealed being the lens 21. When the light source is activated, the light guide 24 lights up and emits light through the light transmissive apex region 21f of the lens 21 to the light emitting surface 21d in a substantially uniform luminous intensity.

The lens 21 may be formed in many different ways. For example, the lens 21 may be a two-component lens comprising a clear or tinted outer portion 21a and an opaque inner portion 21b. The two-component lens may also be formed in a co-moulding process. Alternatively, the lens 21 may be a single component having an opaque coating on an inner surface formed by example by applying paint or a thin film coating. The clear section (or window) 21c may be formed by etching away the opaque coating or masking the area before coating. The window 21c may be approximately 10 mm high.

Figure 9:
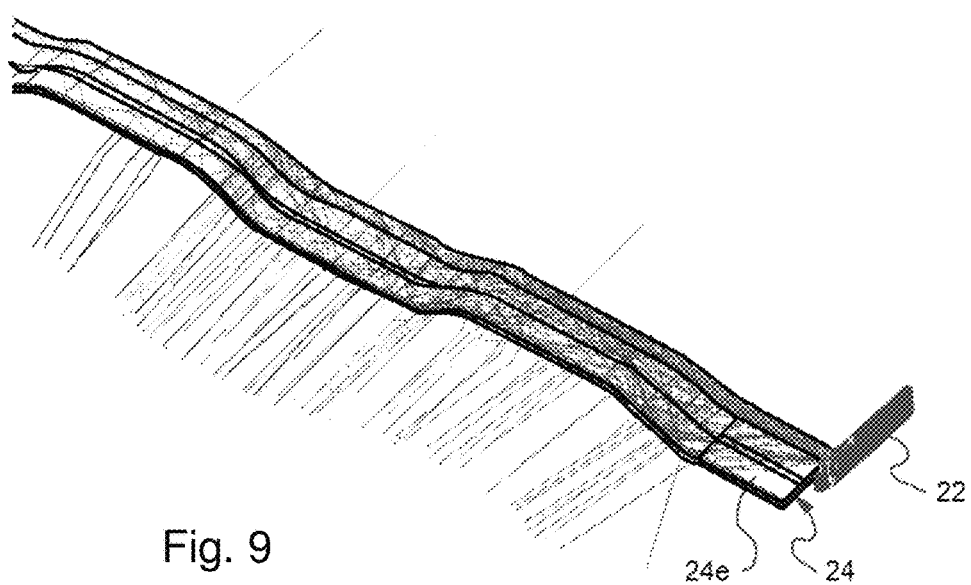
FIG. 9 is an isometric view of a schematic of the elongate light guide of FIG. 4 when in a lit state.
Figure 10:
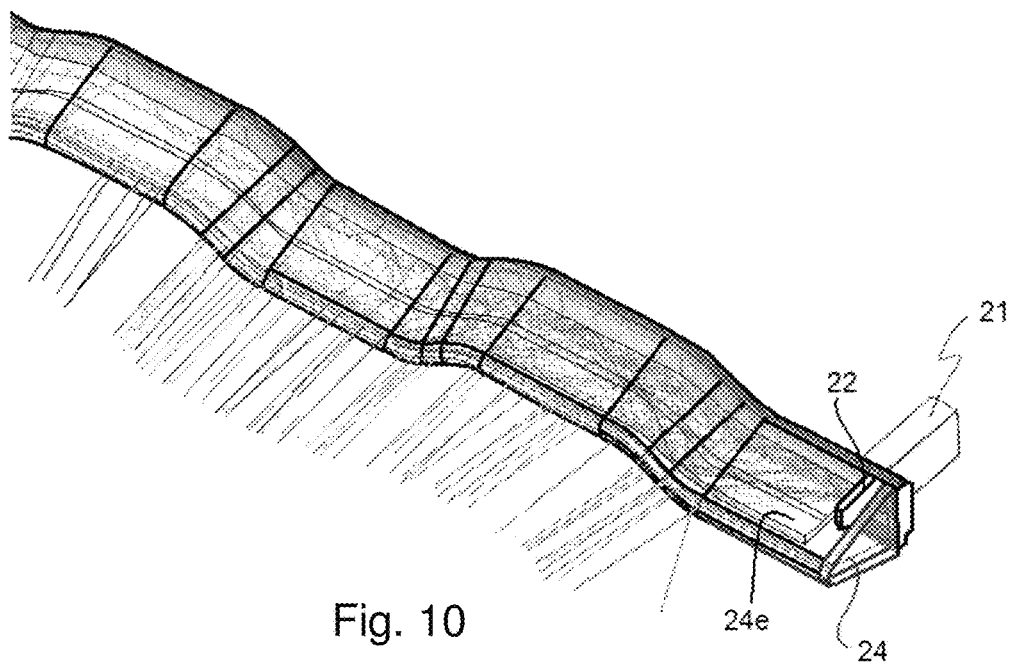
FIG. 10 is an isometric view of a schematic of the elongate illumination assembly of FIG. 3 when in a lit state.
Figure 11:
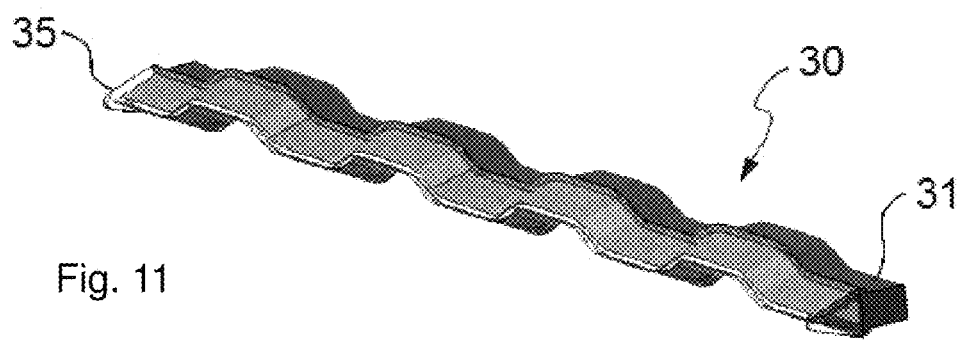
FIG. 11 is a perspective view of an elongate illumination assembly according to another embodiment of the invention.
Figure 12:
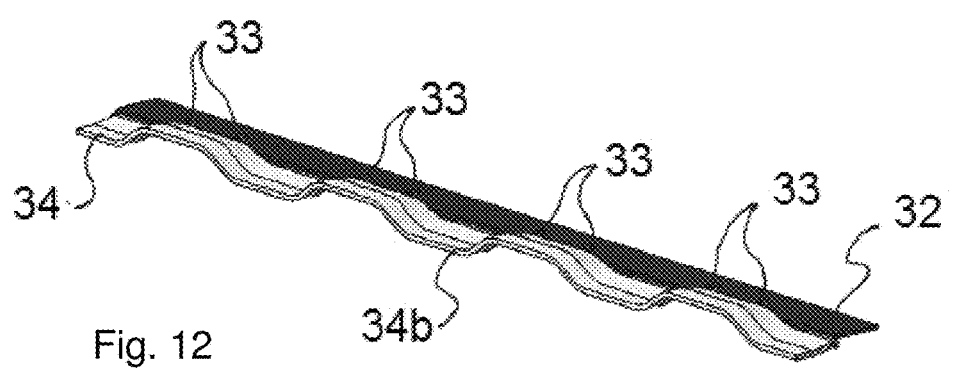
FIG. 12 is a perspective view of the elongate light guide and PCB sub-assembly of FIG. 11.
Figure 13:
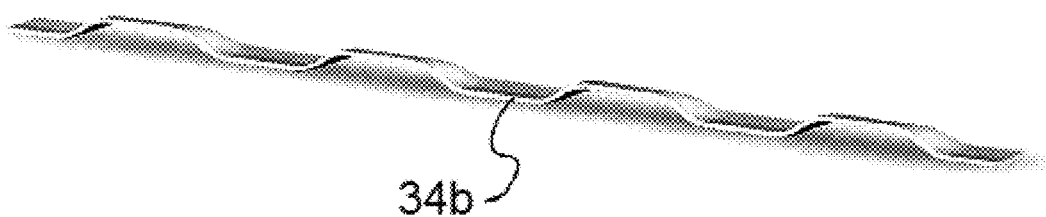
FIG. 13 is a perspective view of the elongate light guide of FIG. 12.

Referring now to FIGS. 9 and 10, which shows a schematic of the elongate light guide 24 and the elongate illumination assembly 20 in a lit state, illustrating how light rays behave when the light guide 24 is lit by a single LED light source, and the light rays enter the light guide 24 and are guided toward the light exiting surface 24e.

The elongate light guide 24 is referred to as a particle filled light guide to distinguish it from a crystal clear light guide (traditional light guide). In a traditional light guide, light is transmitted from a light source to a point at some distance from the source with minimal loss by total internal reflection.

In this particle filled elongate light guide 24, the transmission of light from the light source to the light emitting surface 24e, is achieved through a combination of the use of internal reflection and light scattering particles.

Internal reflection is encouraged through the geometry of the light guide 24, wherein light rays enter the light guide 24 through the first and second light receiving surfaces 24b, 24d and are guided along the rear region 24g of the light guide 24.

The internal geometry of the rear region 24g (bulbous shape and straightened profile) encourages internal reflection with the incidence angle of the bulk of the light rays approaching the outer surface of the rear region 24g such that internal reflection is promoted.

Most light rays that enter the elongate light guide 24 will encounter light scattering particles that alter the direction of the rays. The effect of this light scattering is that light rays will spread throughout the light guide 24, along the transitionary region 24h and into the front region 24f, where they will then exit through the light emitting surface 24e, also ensuring that an even distribution of light output occurs.

The light scattering particles may be titanium dioxide particles of sufficient size and concentration such that the light guide appears transparent when un-lit while providing a substantially uniform luminous intensity surface output when lit.

Referring now to FIGS. 11 to 16, where there is shown an illumination assembly 30 according to an alternative embodiment of the invention. The illumination assembly 30 has housing 31, a PCB 32 featuring a plurality of LEDs 33, a light guide 34 and an elongate lens 35 with a generally V-shaped cross-section and repeating wave pattern profile. Similarly to the first embodiment, the lens 35 profile may be shaped in a variety of different repeating and non-repeating patterns.

The housing 31 forms the backing for the illumination assembly 30 and provides structural reinforcement to the illumination assembly 30 and may be manufactured from a weather resistant plastic such as acrylonitrile styrene acrylate (ASA) or acrylonitrile butadiene styrene (ABS), and is configured to receive the PCB 32. The light guide 34 fits within the V-shape of the lens 35 which is then connected or joined to the housing 31 (e.g. by welding) such that the light guide 34 and PCB 32 are housed within the lens 35 and housing 31.

Figure 16:
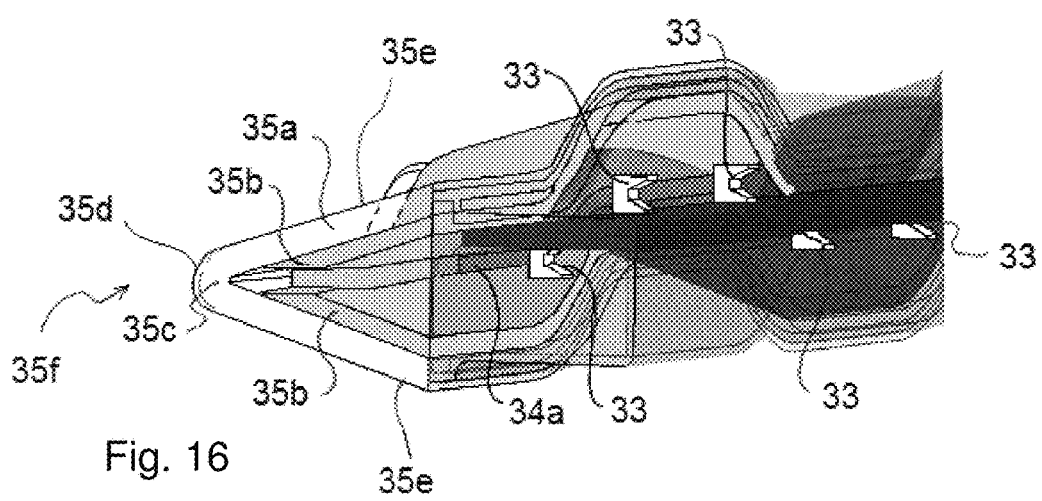
FIG. 16 is a sectional view of the elongate illumination assembly of FIG. 11.

As is best seen in FIG. 16, the PCB 32 is orientated such that its plane is transverse to that of the direction of elongation of the lens 35. A plurality of LEDs 33, are mounted on the top and bottom of the PCB 32, such that their direction of output is toward the light guide 34 and lens 35. The location of the LEDs 33 on the top and bottom of the PCB 32 is influenced by the profile of the lens 35, such that the LEDs 33 follow the profile pattern.

The light guide 34 has a light receiving surface 34a which is adjacent to the LEDs 33, and a light emitting surface 34b viewable to an external viewer of the illumination assembly 30 through the lens 35. The light guide 34 is configured to allow light to enter the light guide 34 through the light receiving surface 34a. The light guide 34 is adapted to be substantially transparent and without any visible discrete optic features in an un-lit state while being diffusive in a lit-state. When lit, light exits the light guide 34 at light emitting surface 34b with substantially uniform luminous intensity across the surface.

Figure 14:
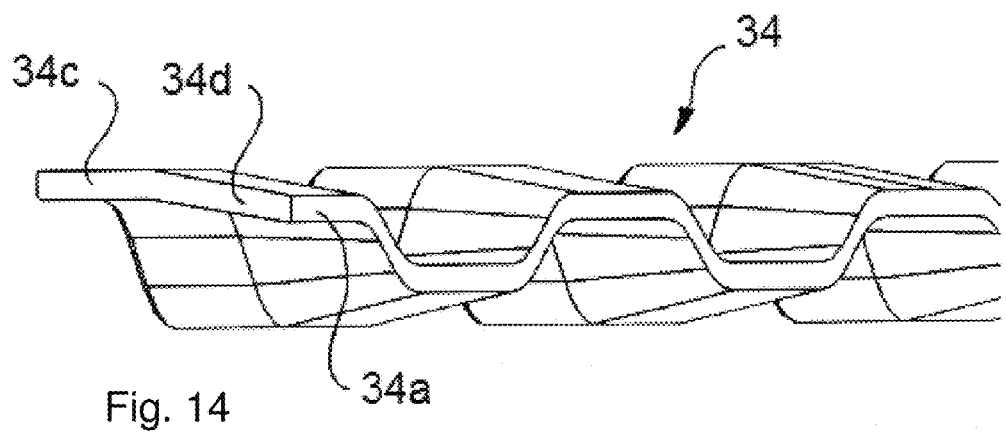
FIG. 14 is a partial rear perspective view of the light guide of FIG. 12 with contour lines.
Figure 15:
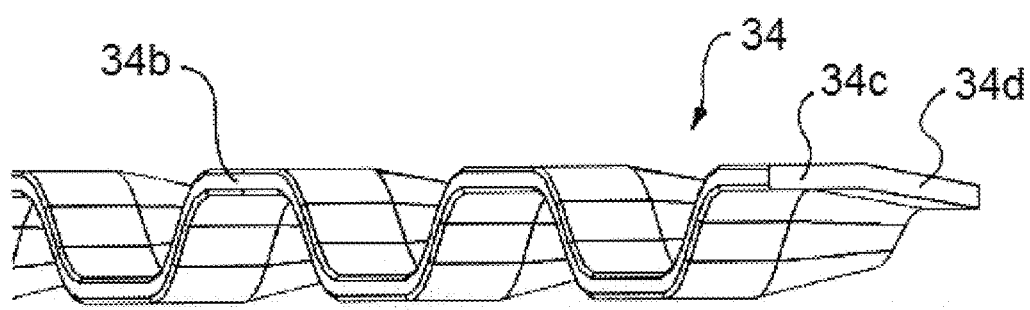
FIG. 15 is a partial front perspective view of the light guide of FIG. 12 with contour lines.

As is best seen in FIGS. 14 and 15, the light guide 34 has a varying profile along its depth. The light emitting surface 34b of the light guide 34 has the same repeating wave profile as the leading edge of the lens 35. The light receiving surface 34a of the light guide 34 also has a repeating wave profile but with a smaller amplitude resulting in a straighter profile.

The light guide has a front region 34c (adjacent the light emitting surface 34b) which has a generally consistent sectional thickness which forms a ribbon-like shape and follows the same profile as the light emitting surface 34b. The light guide also has a transitionary region 34d, connecting the front region 34c and the light receiving surface 34a, and having a profile that transitions from that of the light receiving surface 34a to that of the front region 34c. As shown in FIG. 8, the light guide 34 is disposed behind the lens 35 which has an apex 35f (or leading edge) with a light emitting surface 35d and from which a pair of spaced-apart blade portions 35e extend away to define the generally V-shaped cross-section. The lens 35 has a clear or tinted outer portion 35a and an opaque inner portion 35b, wherein the lens 35 remains entirely clear along the apex 35f immediately behind the light emitting surface 35d and adjacent the light emitting surface 34b of the light guide 34 to allow light emitted from the light guide 34 to enter the lens 35 and exit at the light emitting surface 35d. The effect of this composition is that in an unlit state, the grill assembly 10 has a uniform appearance with the light guide 34 being concealed being the lens 31. When the light source is activated, the light guide 34 lights up and emits light through the light transmissive apex region 31f of the lens 31 to the light emitting surface 31d in a substantially uniform luminous intensity.

The lens 35 may be formed in many different ways. For example, the lens 35 may be a two-component lens comprising a clear or tinted outer portion 35a and an opaque inner portion 35b. The two-component lens may also be formed in a co-moulding process. Alternatively, the lens 35 may be a single component having an opaque coating on an inner surface formed by example by applying paint or a thin film coating. The clear section (or window) 35c may be formed by etching away the opaque coating or masking the area before coating. The window 35c may be approximately 10 mm high.

Figure 17:
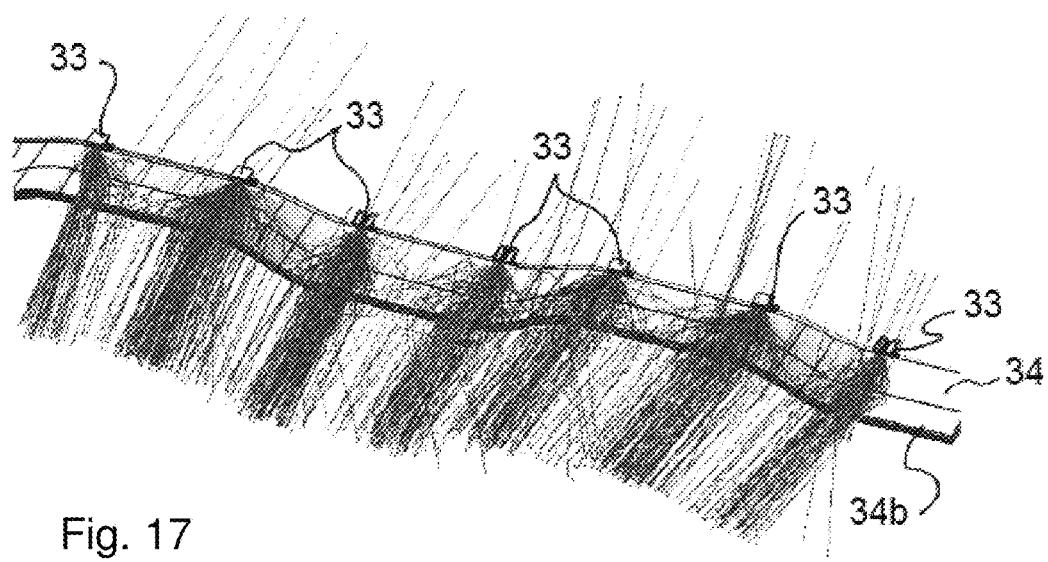
FIG. 17 is an isometric view of a schematic of the elongate light guide of FIG. 12 when in a lit state.
Figure 18:
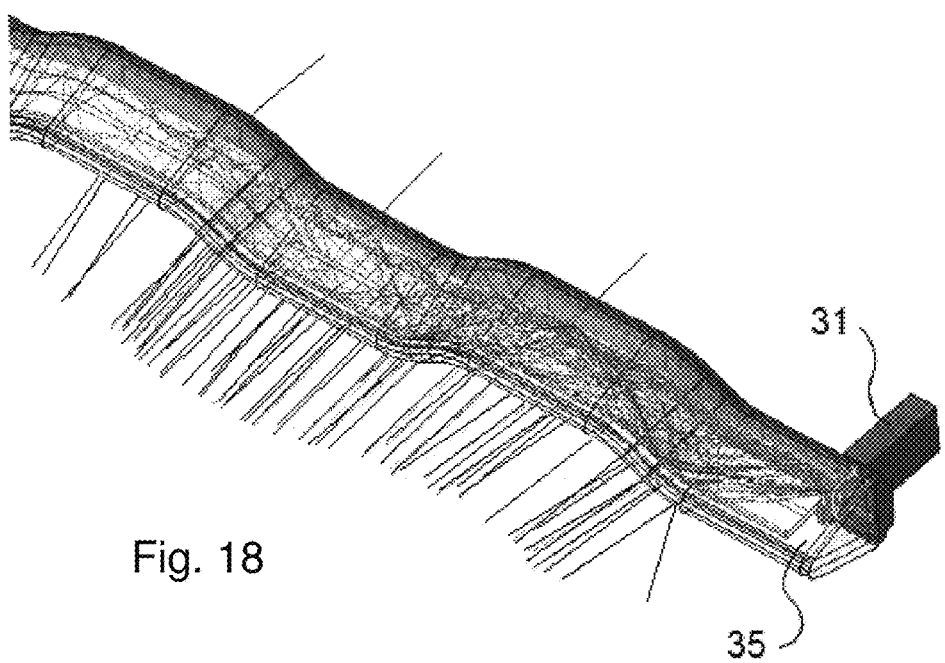
FIG. 18 is an isometric view of a schematic of the elongate illumination assembly of FIG. 11 when in a lit state.

Referring now to FIGS. 17 and 18, which show schematics of the elongate light guide 34 and the elongate illumination assembly 30 in a lit state, illustrating how light rays behave when the light guide 34 is lit by a plurality of LED light sources, and the light rays enter the light guide 34 and are guided toward the light emitting surface 34b.

The elongate light guide 34 is referred to as a particle filled light guide to distinguish it from a crystal clear light guide (traditional light guide). In a traditional light guide, light is transmitted from a light source to a point at some distance from the source with minimal loss by total internal reflection.

In this particle filled elongate light guide 34, the transmission of light from the light source to the light emitting surface 34b, is achieved through a combination of the use of internal reflection and light scattering particles.

Internal reflection is encouraged through the geometry of the light guide 34, wherein light rays enter the light guide 34 through the light receiving surface 34a, and are guided through the transitionary and front regions 34d, 34c of the light guide 34.

The internal geometry of the light guide 34 encourages internal reflection with the incidence angle of the bulk of the light rays approaching the top and bottom surfaces of the light guide 34 such that internal reflection is promoted.

Most light rays that enter the light guide 34 will encounter light scattering particles that alter the direction of the rays. The effect of this light scattering is that light rays will spread throughout the light guide 34, where they will then exit through the light emitting surface 34b with an even light output.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An elongate automotive illumination assembly including:
- an elongate housing;
- at least one light source;
- an elongate lens having an apex region and a pair of spaced-apart blade portions extending away from the apex region to define a generally V-shaped cross-section with the apex region including an elongate light emitting surface, the blade portions connecting to the elongate housing to define an enclosure, the apex region of the elongate lens defines a first repeating wave pattern profile, the first repeating wave pattern profile having a first amplitude; and
- an elongate light guide for guiding light from the at least one light source to the elongate light emitting surface, the elongate light guide including a body extending away from the at least one light source towards the elongate light emitting surface;
- wherein the light guide is housed within the enclosure and between the blades of the lens such that the light emitting surface of the light guide is adjacent to the light emitting surface of the lens.

2. The assembly of claim 1 wherein the light guide includes a plurality of light-scattering particles.

3. The assembly of claim 1 wherein the light emitting surface of the light guide defines a second repeating wave pattern profile, the second repeating wave pattern profile having a second amplitude.

4. The assembly of claim 3 wherein the first repeating wave pattern profile matches the second repeating wave pattern profile.

5. The assembly of claim 4 wherein the elongate light guide has a rear region, the rear region having a third repeating wave pattern profile, the third repeating wave pattern profile having a third amplitude, wherein the third amplitude is smaller than the second amplitude.

6. The assembly of claim 1 wherein the apex region is light transmissive.

7. The assembly of claim 1 wherein each blade portion includes an opaque portion.

8. The assembly of claim 1 wherein the enclosure is weatherproof.

* * * * *